Dec. 21, 1965   G. P. RAUCHWERGER   3,224,676
AUTOMATIC SPRINKLER CONTROL
Filed Nov. 8, 1963   2 Sheets-Sheet 1

INVENTOR.
George P. Rauchwerger
BY
Julian Caplan
attorney

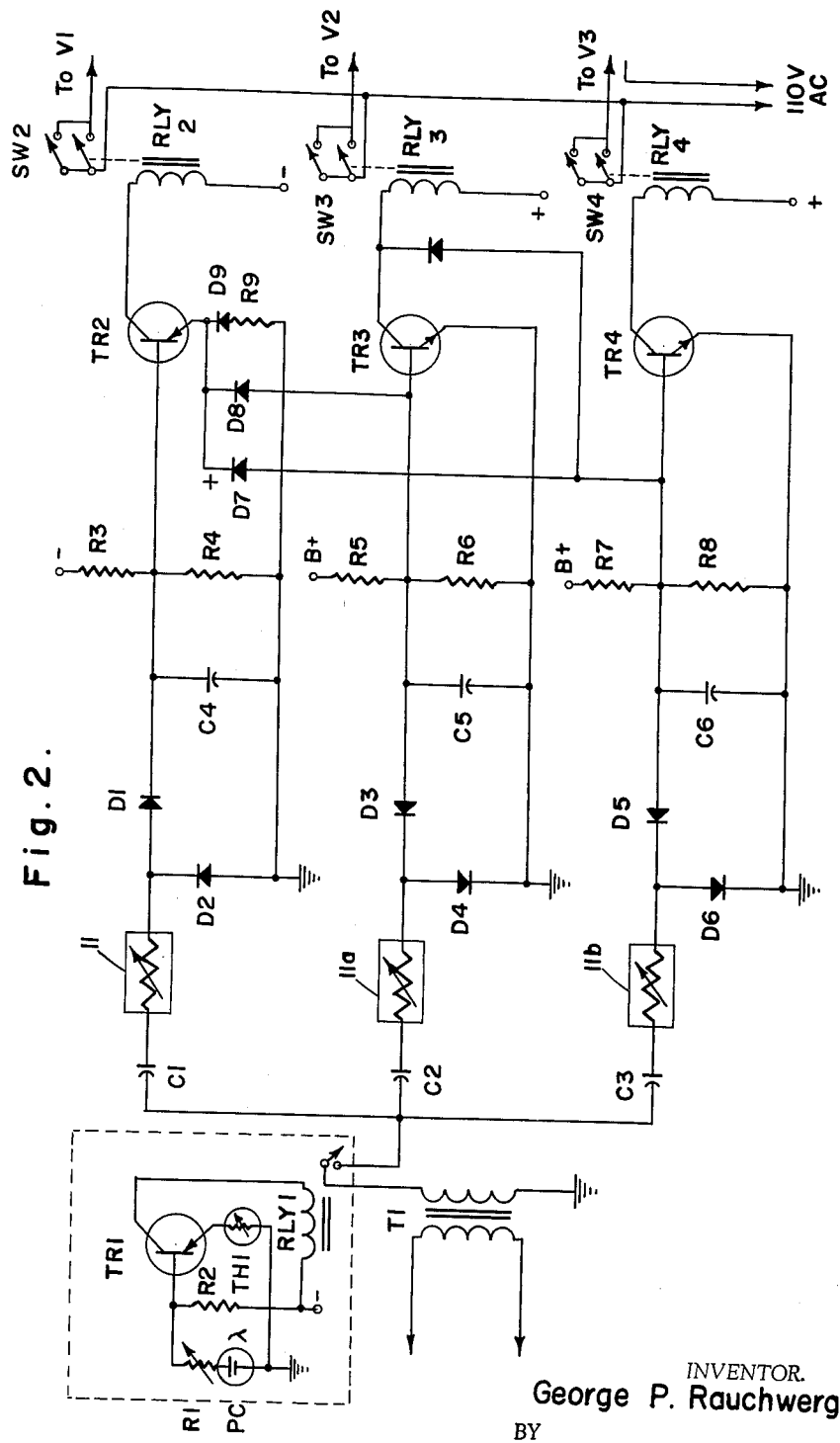

United States Patent Office 3,224,676
Patented Dec. 21, 1965

3,224,676
AUTOMATIC SPRINKLER CONTROL
George P. Rauchwerger, 521 Craig Road,
Hillsborough, Calif.
Filed Nov. 8, 1963, Ser. No. 322,477
7 Claims. (Cl. 239—64)

This invention relates to a new and improved device for controlling the amount of water sprayed on a given lawn or garden area according to the moisture content of the soil, the time of day and the temperature.

A principal object of this invention is to provide an economical, trouble-free, adequate and completely automatic method of irrigation of lawns, gardens, or any field.

Another object is to provide electronic means to sense the moisture contained in the soil at all times.

When the moisture level has fallen below a preset value the sprinkler will turn itself on, irrigate the assigned area until the moisture in the ground reaches the necessary amount required, then it will shut itself off.

A further object is to utilize sunlight as an effective timing mechanism. By the use of a photocell the sprinkler will operate only after dark.

Another object is to protect the existing plumbing associated with the sprinkler when the temperature of the ground falls below freezing by operating the system only above a predetermined ground temperature.

A specific object is to provide a transistor amplifier switch, a photocell, and a thermistor to make this an all solid-state device without timing clock and with only one moving part (the relay which controls the solenoid valve) providing a trouble free, long life and economical operation. It will be understood that the relay may be replaced by a power transistor which will operate a low voltage solenoid valve, thus eliminating all moving parts from the system, save the mechanical valve.

A manual control is also provided to override the electronic system. A multiple area system is also provided using a similar circuit. The multiple system is all electronically controlled without the use of mechanical switches or motors, using only transistors and diodes to sense, select and irrigate the area which requires sprinkling.

The objects of the multiple system are the same as those for the single system.

Other objects of the present invention will become apparent upon reading the following specification and referring to the accompanying drawings in which similar characters of reference represent corresponding parts in each of the several views.

In the drawings:

FIG. 2 is a modification showing multiple valve controls.

Single system

Power switch SW1 applies line voltage (such as 110 v. A.C., 60 cycles) to the primary windings of both stepdown transformers T1 and T2 (these can be a single transformer with two secondary windings) through a protective fuse F1.

The secondary winding of T2 supplies 6.3 v. A.C. to the silicon rectifier diodes, D4, D5, D6, D7 which form a full wave bridge rectifier which is filtered by capacitor C3. R6 is a bleeder resistor. This power supply supplies approximately 8 volts D.C. to the transistor switching circuit.

The secondary winding of T1 supplies 6.3 v. A.C. through C1 to the humidity sensing probe 11; A.C. is preferred to prevent electrolysis in the probe contacts, thus preventing corrosion of the metal parts in it. Also A.C. provides a more accurate measurement of ground moisture, since D.C. electrolysis would create a virtual battery causing erroneous readings and wrong biasing of the transistor switch.

Figure 1:
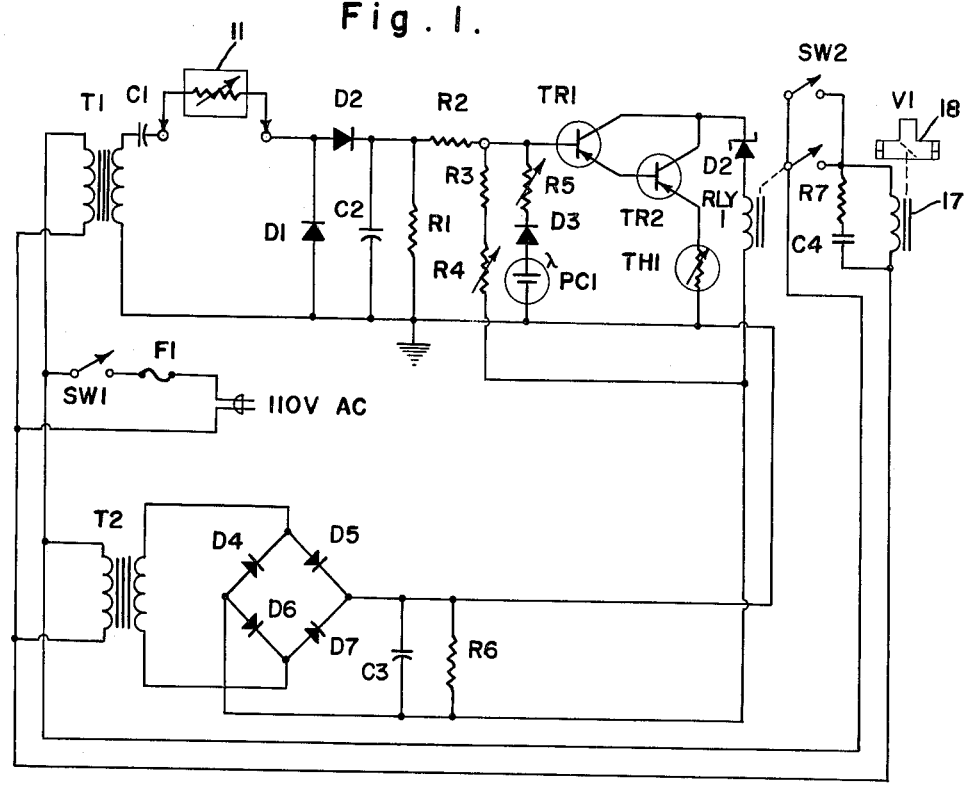
FIG. 1 is a schematic wiring diagram of the connection.
Figure 3:
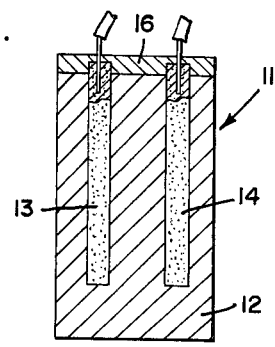
FIG. 3 is a sectional view through a moisture probe used in the invention.
Figure 4:
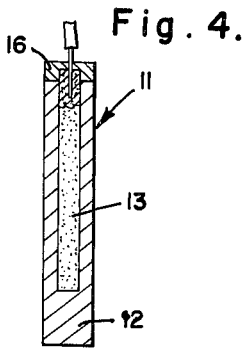
FIG. 4 is a transverse sectional view through the structure of FIG. 3.

The probe 11 shown in FIGS. 3 and 4 consists of a gypsum block 12 used for its excellent hygroscopic capabilities and resistance to erosion; two carbon rods 13, 14, also with high resistance to erosion and good electrical conductivity; and some insulating material 16, such as epoxy to prevent a short circuit with the water.

The probe works as a variable resistor in the A.C. path of T1. A high resistance is indicative of a dry soil, and a low resistance, wet soil.

With a high resistance, little or no current flows through probe 11 and vice versa. This current is rectified by D1, D2 and filtered by C2, R1 being a bleeder resistor. R2 being of high value raises the impedance of the bias power supply to prevent loading effects on the bias of the base circuit of transistor TR1.

The bias circuit for the transistor amplifier switch consists of R3, R4, D3, Pc1, and TH1. R4 is an adjustment of the bias to select a desired moisture range. R5 adjusts the amount of current to be provided by the selenium, self-generating photocell, Pc1. D3 prevents current of opposite polarity from flowing through the photocell. TH1 is a thermistor which controls the current in the collector-emitter circuit of TR2 with changes in temperature. Its value is so selected as to prevent the circuit from closing the relay, RLY1, when the temperature falls below 32° F.

The Darlington Transistor circuit is of high current gain and responds easily to minute changes in moisture of the ground, light and temperature. The amplifier switch operates RLY1 with the proper signal. The relay then controls the solenoid 17 of valve 18 in the sprinkler system from a 110 v. A.C., 60 c.p.s. source. The zener diode, DZ1, adjusts the proper voltage that is put across TR2, and also provides the exact closing of RLY1 at the proper time, and without relay chatter.

Switch SW2 is a manual operation control, thus bypassing the whole circuit; it connects the solenoid 17 of valve 18 directly to the line current.

R7 and C4 are necessary in the circuit to prevent arcing of the relay contacts with the collapsing of the inductive field of the solenoid. (Instead of this RC network, two zener diodes connected back-to-back may be used effectively.)

The operation of the circuit is as follows: When the ground is dry the probe 11 is of a high resistance, thus no current flows. The bias circuit of the transistor switch is set to turn the valve 18 on and water flows to the sprinkler system, providing there is no light impressed upon the photocell and the temperature is above 32° F. When the soil has acquired enough moisture the probe 11 saturates with water, providing a low resistance path between the electrodes, current then flows through the probe; it is then rectified by D1 and D2, supplying a positive back-bias voltage on the base of TR1 which overrides the on-bias, thus turning the transistors off, which in turn opens the relay contacts in RLY1, and shuts off the solenoid valve.

The sprinkler system will then remain in its off state until the soil is dry again. During the daylight hours light is impressed upon the photocell which generates a back bias which keeps the transistors in the off state, preventing any sprinkling during the day. Adjustment R5 regulates the time at which the sprinkler will be ready, i.e., early evening to late evening.

The thermistor TH1 is a variable resistance device which changes resistance with temperature. It has a negative temperature coefficient. Thus with a low temperature its resistance is high, limiting the current flow in the emitter-collector circuit of TR2. When the ambient temperature falls to freezing the relay coil RLY1 is not energized and the sprinkler cannot go on. This prevents damage to the solenoid valve and to the plumbing associated with the system.

SW2 may be manually operated to open and close V1 independent of the electronic components.

*Multiple system*

The principle of operation for a series of sprinkler valves each in proximity to an individual probe 11, 11a, 11b, is essentially the same as that in the single system.

The light and temperature control amplifier switch allows the system to operate during the dark hours, and when the temperature is above freezing.

The system here described is for three areas, for the purpose of simplicity.

Only one area may be irrigated at a time. This is accomplished as follows:

When current flows through the emitter-collector circuit of TR2, a voltage drop occurs across the resistor-diode combination R9, D9. This voltage, of negative polarity, is tapped off by D7 and D8, supplying a back-bias to transistors TR3 and TR4. This back-bias keeps TR3 and TR4 in the off state until TR2 ceases to conduct (area 1 is then saturated). With transistor TR2 off, no back-bias voltage is developed across R9 and D9, hence transistors TR3 and TR4 are ready to go on (assuming the conditions for irrigation are met). Both TR3 and TR4 will start drawing current simultaneously; however, diode D10 taps off enough back-bias voltage, which is developed across RLY3, to turn TR4 off, and area 2 can proceed with the irrigation. When this is done, TR4 is free to turn on and irrigate area 3.

More units may be added in the same fashion, all of which will operate individually but controlled by the other stages.

The diodes D7, D8, D9, D10 act as one way valves for the bias currents.

A power supply with a double polarity and a common ground is necessary for the proper operation of this circuit.

Provision is also made for manual operation of each area (SW2, SW3, SW4).

Transistors TR1 and TR2 are P-N-P, and transistors TR3 and TR4 are N-P-N.

Although the foregoing invention has been described in some detail, by way of illustration and example for purposes of clarity of understanding, it is understood that certain changes and modifications may be practiced within the spirit of the invention and scope of the appended claims.

What is claimed is:

1. In a sprinkler system, a conduit, a valve in said conduit, a solenoid opening and closing said valve, a source of current, a relay controlling energization of said solenoid to said current and having a coil, and a circuit including said coil energized by said current and comprising a photocell arranged to interrupt said circuit in daylight, a probe in said circuit having two electrodes and hygroscopic material between said electrodes in contact with soil irrigated by said system characterized by a change in resistance of said material when said soil is wet, said probe arranged to open said circuit when said soil is wet.

2. A system according to claim 1, which further comprises a thermistor in said circuit arranged to open said circuit when outside temperature is below a pre-selected point.

3. A system according to claim 2, which further comprises a first and second transistor in said circuit to control the energization of said coil in said relay.

4. A system according to claim 2, which further comprises a second conduit, a second valve in said conduit, a second relay controlling energization of said second solenoid and having a second coil, a second probe in said circuit, said first mentioned probe arranged to open said circuit to close said first mentioned valve when an area irrigated by said first conduit is wet and said second probe arranged to close said second valve when an area irrigated by said second conduit is wet.

5. A system according to claim 4, wherein said second relay opens said second valve only after said first mentioned probe has become wet and said first mentioned valve has been closed by said circuit.

6. A system according to claim 3, in which said first transistor has its collector in series with said coil in said circuit; said probe is connected through said circuit in series with the base of said first transistor to cause a negative voltage to be applied to the base of said first transistor when said soil is dry, to close said circuit through said first transistor and to open said valve; said photocell is connected to positively bias said first transistor during daylight hours to open said circuit through said first transistor and to maintain said valve closed; said thermistor is connected in series with the emitter of said first transistor to open said circuit through said first transistor at times of low temperature.

7. In a sprinkler system, the combination of a conduit conveying water to the soil; a valve in said conduit; a solenoid controlling said valve; a relay having a coil, the contacts of said relay being normally open in the circuit of said solenoid; a control circuit comprising a full wave bridge rectifier supplying direct current to said control circuit; a transformer with the secondary windings of said transformer supplying low A.C. voltage to said bridge rectifier and to the input of said control circuit; a probe, said probe having two electrodes and hydroscopic material between said electrodes in contact with soil irrigated by said system; a diode, a resistor, a first and second transistor, said probe having one connection to said secondary winding and a second connection in series with said diode and said resistor to the base of said first transistor to cause a negative voltage to be applied to said base of said first transistor when the soil is dry, thereby permitting conduction through said first and second transistors and causing said valve to open; a grounded positive line connection between one side of said secondary winding and the positive side of said bridge rectifier; a self-generating photocell, a second diode, a variable second resistance with said second diode and said variable second resistance connected in series with said photocell, all in parallel with said grounded line connection and said base of said first transistor such that during daylight hours said photocell generates a positive bias voltage that is applied to said base of said first transistor to prevent conduction through said first and second transistors and to prevent said valve from opening; a variable third resistance connected between said base of said first transistor and the negative side of said rectifier bridge to control sensibility of said control circuit to moisture in said probe; a thermistor with the base of said second transistor connected to the emitter of said first transistor and with the collector of said second transistor connected to the collector of said first transistor and with the emitter of said second transistor connected in series with said thermistor to said grounded line connection to prevent conduction through said second transistor at times of low temperature; a zener third diode connected to said collector of said second transistor and to one side of said coil in said relay, with the other end of said coil in said relay connected to said negative side of said rectifier bridge; a fourth diode connected to the connection of said probe with said first diode and to said grounded line connection; a capacitor and a fourth resistance connected in parallel to the connection of said first diode with said first resistor and to said grounded line connection.

References Cited by the Examiner
UNITED STATES PATENTS

| | | | |
|---|---|---|---|
| 2,524,796 | 10/1950 | Higgins | 236—80 |
| 2,911,156 | 11/1959 | Freeman | 239—63 |
| 2,989,667 | 6/1961 | Swink | 317—142 |
| 3,039,698 | 6/1962 | Richards | 239—62 |
| 3,113,724 | 12/1963 | De Bough | 239—63 |

EVERETT W. KIRBY, *Primary Examiner.*